(12) United States Patent
Fiondella et al.

(10) Patent No.: US 11,446,669 B2
(45) Date of Patent: Sep. 20, 2022

(54) SYSTEM AND APPARATUS FOR AUDITING BIOLOGICAL SAMPLES IN COLD STORAGE

(71) Applicants: Enzo Fiondella, Pinner Middlesex (GB); Peter Parker, Pinner Middlesex (GB); John Dunton, Pinner Middlesex (GB)

(72) Inventors: Enzo Fiondella, Pinner Middlesex (GB); Peter Parker, Pinner Middlesex (GB); John Dunton, Pinner Middlesex (GB)

(*) Notice: Subject to any disclaimer, the term of this patent is extended or adjusted under 35 U.S.C. 154(b) by 585 days.

(21) Appl. No.: 16/322,342

(22) PCT Filed: Aug. 4, 2017

(86) PCT No.: PCT/GB2017/052315
§ 371 (c)(1),
(2) Date: Jan. 31, 2019

(87) PCT Pub. No.: WO2018/025053
PCT Pub. Date: Feb. 8, 2018

(65) Prior Publication Data
US 2019/0193078 A1 Jun. 27, 2019

(30) Foreign Application Priority Data

Aug. 4, 2016 (GB) ..................... 1613484

(51) Int. Cl.
*B01L 3/00* (2006.01)
*A01N 1/02* (2006.01)
*B01L 7/00* (2006.01)

(52) U.S. Cl.
CPC ............ *B01L 3/545* (2013.01); *A01N 1/0242* (2013.01); *A01N 1/0257* (2013.01);
(Continued)

(58) Field of Classification Search
None
See application file for complete search history.

(56) References Cited

U.S. PATENT DOCUMENTS 4,314,450 A * 2/1982 Pelloux-Gervais ...... A01N 1/02
62/51.1
5,022,236 A * 6/1991 Knippscheer ........ A01N 1/0263
165/104.21
(Continued)

FOREIGN PATENT DOCUMENTS

EP 2743865 6/2014
WO WO 2005/109332 11/2005
(Continued)

OTHER PUBLICATIONS

Hsu et al., A Study of Making Ferrimagnetic Sheet Materials for RFID Applications, 2010, China Steel Technical Report, No. 23, pp. 42-45 (Year: 2010).*
(Continued)

*Primary Examiner* — Holly Kipouros
(74) *Attorney, Agent, or Firm* — Norton Rose Fulbright US LLP (57) ABSTRACT

A system for the remote live auditing of biological samples contained in a cold storage vessel (10). The vessel (10) comprises one or more canisters (100(1), 100(2)), each of which comprises a connector (102(1), 102(2)) and is configured to hold at least one container (50), each of which contains one or more biological samples and has associated therewith an RFID tag identifying the container (50) in question. The system further comprises a docking assembly (200) mounted on the vessel (10) and comprising a plurality of connectors (202), each of which is configured to engage with the connector (102(1), 102(2)) of one of said canisters (100(1), 100(2)), thereby providing an electrical connection between the docking assembly (200) and the canister (50) in
(Continued)

question. Each canister (100(1), 100(2)) is operable to wirelessly interrogate the RFID tags of the containers (50) held therein, to receive information identifying the containers (50) as a result of the interrogation, and to communicate this identifying information to the docking assembly (200) via the electrical connection. Also disclosed are a canister and a docking assembly suitable for use in the system.

10 Claims, 4 Drawing Sheets

(52) U.S. Cl.
CPC .............. *A01N 1/0268* (2013.01); *B01L 7/50* (2013.01); *B01L 2300/022* (2013.01); *B01L 2300/023* (2013.01); *B01L 2300/0609* (2013.01); *B01L 2300/1883* (2013.01)

(56) References Cited

U.S. PATENT DOCUMENTS

| | | | |
|---|---|---|---|
| 5,419,143 | A | 5/1995 | Leonard et al. |
| 2005/0247782 | A1 | 11/2005 | Ambartsoumian |
| 2011/0199187 | A1 | 8/2011 | Davidowitz |
| 2011/0277486 | A1 | 11/2011 | Zimmermann et al. |
| 2012/0293338 | A1* | 11/2012 | Chaffey ............... A01N 1/0257 340/870.02 |
| 2013/0105503 | A1* | 5/2013 | Cognard ............ B65D 77/0493 220/735 |
| 2013/0232998 | A1* | 9/2013 | Ward ................... A01N 1/0268 62/51.1 |
| 2014/0230472 | A1 | 8/2014 | Coradetti et al. |
| 2014/0277695 | A1* | 9/2014 | Iqbal ................ G01N 35/00732 700/225 |
| 2015/0205986 | A1 | 7/2015 | Morris et al. |
| 2016/0364640 | A1* | 12/2016 | Dachniwskyj ....... H01Q 1/2225 |

FOREIGN PATENT DOCUMENTS

| | | |
|---|---|---|
| WO | WO 2009/003231 | 1/2009 |
| WO | WO 2014/009729 | 1/2014 |

OTHER PUBLICATIONS

Examination Report under Section 18(3) from the Intellectual Property Office of the United Kingdom issued in corresponding Application No. GB1613484.4 dated May 4, 2021.
Teknomechanics, "Cryogenic canister with integrated RFiD system", accessed online, URL: <https://www.teknomechanics.com/portfolio/cryogenic-canister-integrated-rfid-system/>, 2014.
Extended European Search Report issued from the European Patent Office in corresponding Application No. 20179832.9 dated Oct. 9, 2020.
Teknomechanics Engineering S.L.: "Crygogenic canister with integrated RFiD system", Apr. 21, 2016, XP055439110, Retrieved from the Internet: URL: https://www.teknomechanics.com/portfolio/cryogenic-canisiter-integrated-rfid-system/ [retrieved on Jan. 9, 2018].
"Cryogenic canister with integrated RFiD system" Teknomechanics Engineering S.L., 2014, Retrieved from the Internet, URL: < https://www.teknomechanics.com/portfolio/cryogenic-cansiter-integrated-rfid-system >, accessed Jul. 31, 2019.
International Search Report and Written Opinion issued in Corresponding International Patent Application No. PCT/GB2017/052315, dated Jan. 16, 2018.
Search Report issued in Corresponding GB Application No. GB1613484.3, dated Feb. 8, 2017.

* cited by examiner

SYSTEM AND APPARATUS FOR AUDITING BIOLOGICAL SAMPLES IN COLD STORAGE

CROSS-REFERENCE TO RELATED APPLICATION

This application is a national phase under 35 U.S.C. § 371 of International Application No. PCT/GB2017/052315, filed Aug. 4, 2017, which claims the benefit of priority to Great Britain Application No. 1613484.3, filed Aug. 4, 2016, the entire contents of each of which are hereby incorporated by reference in their respective entireties.

FIELD OF THE INVENTION

The present invention relates generally to the auditing of biological samples in cold storage and, in particular, to the auditing of biological samples that are stored in coolant fluid, such as cryogenic fluid, for instance liquid nitrogen.

INTRODUCTION

A wide variety of biological samples are kept in cold storage, such as stem cells, blood, and histological samples, as well as reproductive samples, such as sperm, embryos and eggs.

Labelling and tracking such samples is of vital importance: mixing up two different samples may have profound consequences. In addition, if the label for a sample is lost, it may be difficult, costly and time-consuming—or perhaps even impossible—to then identify that sample.

Biological samples are often stored in a vessel, such as a vacuum flask, that contains coolant fluid, such as cryogenic fluid (e.g. liquid nitrogen). Certain types of biological samples are required to be audited at regular intervals. However, when the samples are removed, albeit briefly, from cold storage in order for their identities to be checked, they will tend to warm up, which may reduce their storage lifetime.

For these and other reasons, there is a need for systems and devices that enable effective and efficient auditing of biological samples in cold storage.

SUMMARY

Aspects of the invention are set out in the appended claims.

BRIEF DESCRIPTION OF THE DRAWINGS

The invention will now be described with reference to the drawings, in which.

DETAILED DESCRIPTION OF THE DRAWINGS

Figure 1:
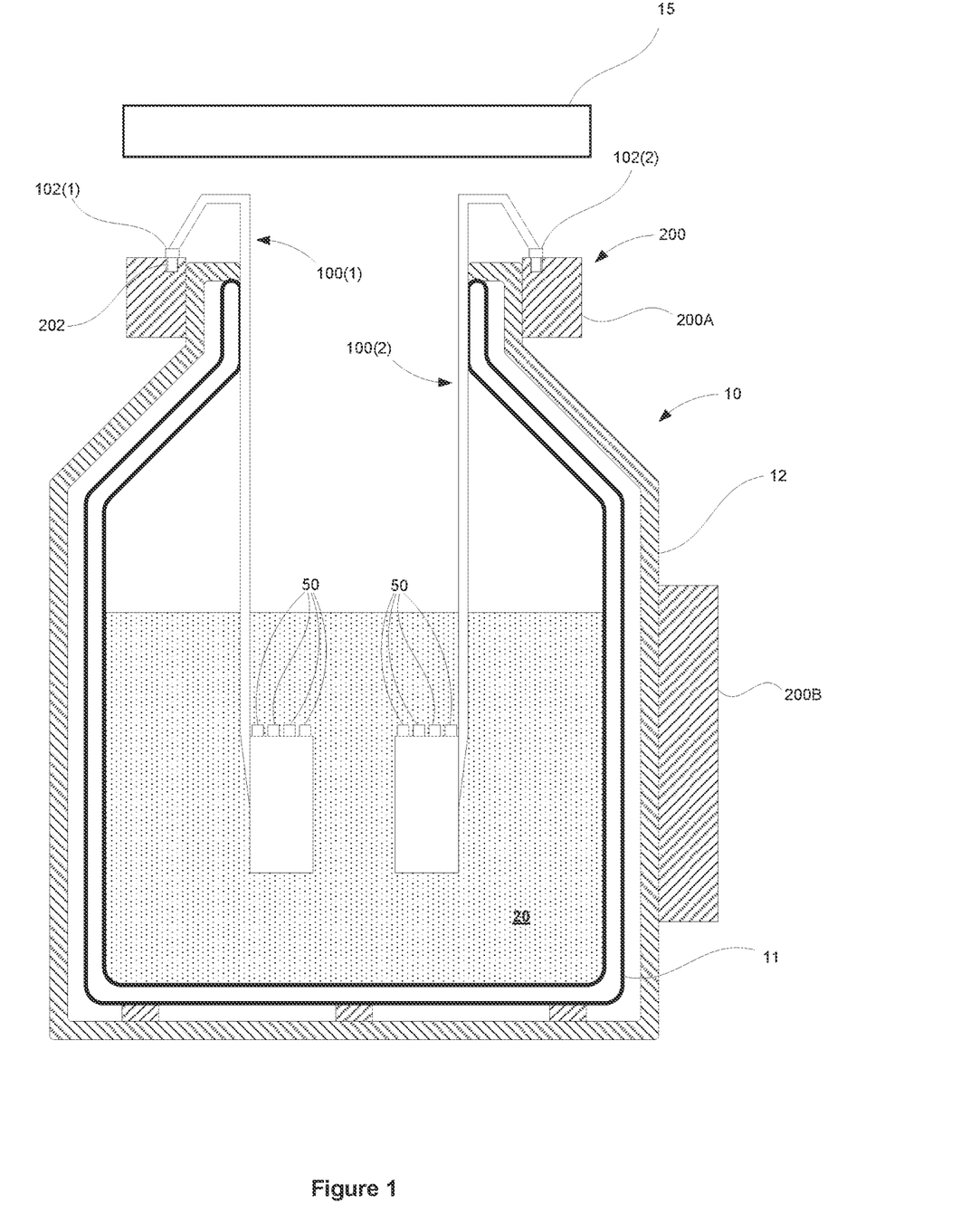
FIG. 1 is a cross-sectional view through a vessel filled with coolant fluid that has installed therewith a system for remote live auditing of biological samples contained in the vessel.

FIG. 1 illustrates an example embodiment of a system that allows the remote live auditing of biological samples while contained in a vessel 10 filled with coolant fluid 20. FIG. 1 is a cross-sectional view through such a vessel 10 and therefore shows clearly the components of the system present within the vessel.

In the particular example shown in the drawing, the vessel 10 is a vacuum flask, such as a Dewar flask. Such a vacuum flask may thermally insulate the contents of the vessel 10 from the outside environment, which assists the coolant fluid 20 in maintaining the biological samples in a cooled state. In the particular example shown, the vessel includes a double-walled container 11 provided within a casing 12.

The contents of the vessel 10 may be maintained at a temperature that is significantly below room temperature for long periods of time. To further assist in maintaining the low temperature within the vessel 10, the coolant fluid 20 within the vessel 10 may be replaced periodically. For instance, the coolant fluid 20 may evaporate over time and further coolant fluid 20 in a liquid state and at lower temperature may be added to replace the evaporated fluid.

The coolant fluid may be a cryogenic coolant fluid such as, for example, liquid nitrogen. Liquid nitrogen is commonly used because it is in a liquid state at extremely low temperature, having a freezing point of 63K. Further, its very low boiling point of 77K means that it may be kept in the flask in an essentially constantly slow-boiling state, which results in it maintaining a roughly constant temperature around its boiling point.

As may be seen from FIG. 1, the system includes a docking assembly 200 and a number of canisters 100. While only two canisters 100(1), 100(2) are shown in the drawing, it should be understood that substantially any number of canisters that is suitable for the vessel (e.g. four, six, eight etc. canisters) could be provided. Each canister 100 is configured to hold a number of containers 50, each of which contains at least one biological sample and is provided with an RFID tag, which identifies the container 50 in question and may, as a result, identify the biological sample(s) within that container 50.

To give a straightforward example, the containers 50 may, for instance, be vials, straws and/or bags, with each such container containing a single sample and being provided with a corresponding RFID tag. However, it is envisaged that the system will be utilised in a more complex manner, with the containers 50 being combined hierarchically. For instance, a number of straws (each containing a respective sample) may be stored within a single visotube, a number of visotubes may in turn be stored within a single goblet, and a number of goblets may be stored within a canister 100. It will therefore be understood that, for example, such a goblet contains potentially a large number of samples, since it contains a number of visotubes, each containing a number of straws, each of which contains a respective sample. Each such straw, visotube and goblet may be provided with a respective RFID tag identifying the container 50 in question, it being understood that the term "container" is used in a general sense in this document and may refer to straws, visotubes and/or goblets.

Furthermore, in some cases the containers may be disposable.

The docking assembly 200 is configured so that it can be mounted on the vessel 10, for example in the manner shown in FIG. 1. As is also shown in the drawing, the docking assembly includes a number of connectors 202, each of which is configured to engage with a connector 102 provided by one of the canisters 100. For instance, in FIG. 1 the connectors 102(1), 102(2) for both of the canisters 100(1), 100(2) are engaged with a respective one of the connectors 202 provided by the docking assembly 200. The engagement between a connector on a canister 102 and a connector on the docking assembly 202 provides an electrical connection between the docking assembly 200 and the canister in question 100.

In a particular example, the connectors 102, 202 are FAKRA connectors; however, they may be of any suitable type, such as SMA, SMB or SMC connectors.

As noted above, each of the containers 50 is provided with an RFID tag that identifies that container. Each of the canisters 100 is operable to wirelessly interrogate the RFID tags of the containers 50 held within it. As a result, the canister 100 in question receives information identifying the containers 50 that it holds from the RFID tags on the containers 50. The canister 100 is configured to communicate this identifying information to the docking assembly 200 via the connectors 102, 202 and the electrical connection that they provide between the canister 100 and the docking assembly 200. The system may then, by accessing a database in which each container 50 is associated with one or more corresponding biological samples, identify which biological samples are present in a particular canister 100. Alternatively, or in addition, each RFID tag may additionally have stored thereon data identifying the biological sample(s) that it contains. This biological sample data may form part of the identifying information sent to the docking assembly 200. In either case, the system is able to carry out remote live auditing of the biological samples while they are contained in the vessel 10.

In a particular example, the RFID tags operate in a HF (high frequency) band, e.g. according to ISO 18000-6A. Such tags typically have a maximum read-range of around 1 m, which is more than sufficient for most canister designs, while also being low-cost.

In other examples, tags that operate at lower frequencies, such as in the LF (low frequency) band might be used (e.g. according to ISO 18000-3), though these typically have shorter maximum read ranges. Equally, in still other examples, tags that operate at higher frequencies might perhaps be used, though these generally require significantly more power and are typically expensive.

It should be noted that, owing to evaporation, part of the coolant fluid 20 may be in a gaseous form. As the resulting gas will typically also be at a low temperature, it may not be necessary for the containers 50 held within the canisters 100 to be submerged within the liquid part of the coolant fluid 20, as is shown in FIG. 1. Indeed, with some vessels, such as vapour phase Dewar flasks, it is common practice for containers to be kept in the gas part of the coolant fluid.

In some examples, the docking assembly 200 may manage and control the reading by the canisters 100 of the container RFID tags. Hence, or otherwise, the canisters 100 may not include any active (powered) components.

The docking assembly 200 may accordingly be configured to communicate with the canisters 100, via the electrical connections provided by the connectors 102,202, and to thereby cause the canisters 100 to wirelessly interrogate the RFID tags of the containers 50 that they hold. For instance, to read the RFID tags of containers 50 in a particular canister, the docking assembly 200 may send an electrical interrogation signal to that canister 100, with the canister transmitting a corresponding wireless signal to the RFID tags. The RFID tags respond with a wireless response signal, which causes an electrical response signal to be generated within the canister 100. The canister 100 may then convey this electrical response signal to the docking assembly 200.

In some examples, the docking assembly 200 may further include a wireless transceiver 250 (not shown in FIG. 1). Wireless connectivity may be convenient as it reduces the amount of clutter in a storage facility and allows vessels to be switched in and out more easily.

Such a wireless transceiver 250 may be used to send information identifying the containers 50 held within the canisters 100 of a vessel 10 to a server 300. Such identifying information may, for instance, specify which containers 50 are held in which canister 100 within the vessel 10. The server may check this information against a database and thereby determine whether a particular container 50 is being held in the correct canister 100 (and, indeed, the correct vessel 10, where there are multiple vessels within the system).

As noted above, in some cases each RFID tag may additionally have stored thereon data identifying the biological sample(s) that its corresponding container 50 contains. This biological sample data may form part of the identifying information sent to the server 300. Further, this biological sample data may be used as part of the determination as to whether a particular container 50 is held in the correct canister 100.

The docking assembly 200 may be configured to send additional information to the server 25 using the wireless transceiver 250. For instance, the docking assembly 200 may notify the server 300 that the lid of the vessel 10 has been removed and, equally, may notify the server when the lid 15 is replaced. The docking assembly 200 may therefore include one or more micro switches for detecting whether the lid is in place on the vessel.

Similarly, the docking assembly 200 may notify the server 300 when one of its connectors 202 has a canister 100 connected thereto and, equally, may notify the server when a canister is disconnected from one of the docking assembly connectors 202. The docking assembly 200 may therefore include respective micro switches for detecting whether a canister is connected to a corresponding one of the docking assembly connectors 202.

Such additional information may be sent whenever a relevant event occurs, such as the 35 removal/replacement of the lid 15 or the connection/disconnection of a canister to one of the docking assembly connectors 202, or may be sent at periodic intervals. In the latter case, the additional information may include the time of such events, as well as their nature ("lid removed", "lid replaced", etc.).

The wireless transceiver 250 may also be utilised to receive messages from the server 300. For instance, the server 300 may send "read" messages to the docking assembly 200. Upon reception of such a "read" message, the docking assembly 200 may cause a canister 100 to interrogate the RFID tags of the containers that it contains. The "read" message could specify certain canisters to the docking assembly 200, or could be a general "read" message, which causes the docking assembly 200 to instruct all of the canisters 100 to wirelessly interrogate the RFID tags of the containers they contain.

A "read" message that specifies a particular canister 100 could, for example, be utilised by the server in a case where the "logical reliability" of the data for that particular canister was poor.

In some examples, the docking assembly 200 may be configured such that, in a case where it is to cause a number of, or all of the canisters 100 to carry out readings (for example in response to an appropriate "read" request from server 300), it causes each canister in turn to interrogate the RFID tags of the containers 50 therein. Such an approach may reduce interference between the various canisters being read.

In other examples, the docking assembly 200 may be configured such that it causes the specified group of, or all of the canisters 100 to carry out readings simultaneously.

The docking assembly 200 may take a variety of forms. In particular, it may be configured such that the electrical connections between it and the canisters 100 that are provided by the connectors 102, 202, are maintained when the lid of the vessel 10 is in place. Moreover, it may be configured such that these electrical connections are maintained regardless of whether the lid is in place or removed. Hence, or otherwise, the RFID tags of the containers 50 may be read without having to open the vessel 10. This may enable the samples to be remotely audited without significantly affecting their temperature, thus increasing the time that they may be stored.

In the example embodiment shown in FIG. 1, the docking assembly 200 includes a neck module 200A that is configured to be mounted around the neck of the vessel 10. Such a neck module 200A may be generally ring-shaped, so as to fit around the neck of the vessel 10. In addition, or instead, the shape of the neck module 200A may in some examples be adjustable, such that it can fit around the necks of differently sized vessels 10. In a particular example, the neck module 200A may be configured such that it can form a ring with a range of diameters, which may, for example, enable its use with a range of different vessels. Hence, or otherwise, the neck module 200A might be partially flexible (e.g. configured as an adjustable belt or strap).

As is apparent from FIG. 1, the connectors 202 for the docking assembly 200 are provided on the neck module 200A. In a particular example, the connectors may be located on the neck module 200A such that, when the docking assembly 200 is mounted on a vessel, the connectors 202 are circumferentially arranged around the neck of the vessel.

Especially where the connectors 202 for the docking assembly are provided on the neck module 200A, the neck module 200A may be suitably configured such that the electrical connections between it and the canisters 100 are maintained regardless of whether the lid for the vessel 10 is in place or removed. Hence, or otherwise, the RFID tags of the containers 50 may be read without having to open the vessel 10.

In the particular embodiment shown in FIG. 1, the docking assembly 200 may optionally include an additional module 200B, which is configured so as to be strapped around the body of the vessel. This additional module 200B is electrically connected to the neck module 200A so that, for example, the additional module 200B may receive data from the neck module 200A and/or the additional module 200B may send commands, such as read commands, to the neck module 200A. As will be discussed below with reference to FIG. 3, the additional module 200B may provide the wireless transceiver 250 and may include a micro controller 240, for example arranged as one or more processors.

The docking assembly 200 may instead (or perhaps in addition), include a lid module. Such a lid module may be shaped so as to enclose the top of the vessel and may thus replace the vessel's standard lid (though it could instead be shaped so as to be mounted on top of the standard lid for the vessel). Where both a lid module and a neck module are provided, they may be configured, for example by having complementary shapes, so as to engage with one another. Further, they may be electrically connected, for instance via a tether that physically links them together, while still allowing the lid module to be removed from the vessel 10 where necessary. Of course, as an alternative, a tether could be provided that does not provide electrical connection between the lid module and the neck module.

The docking assembly 200 may be provided with an internal power source, such as one or more batteries. Hence, the docking assembly may not require attachment to a power supply with a power cord. This may conveniently reduce the amount of clutter in a storage facility and may allow vessels to be switched in and out more easily.

Figures 2A, 2B, 2C:
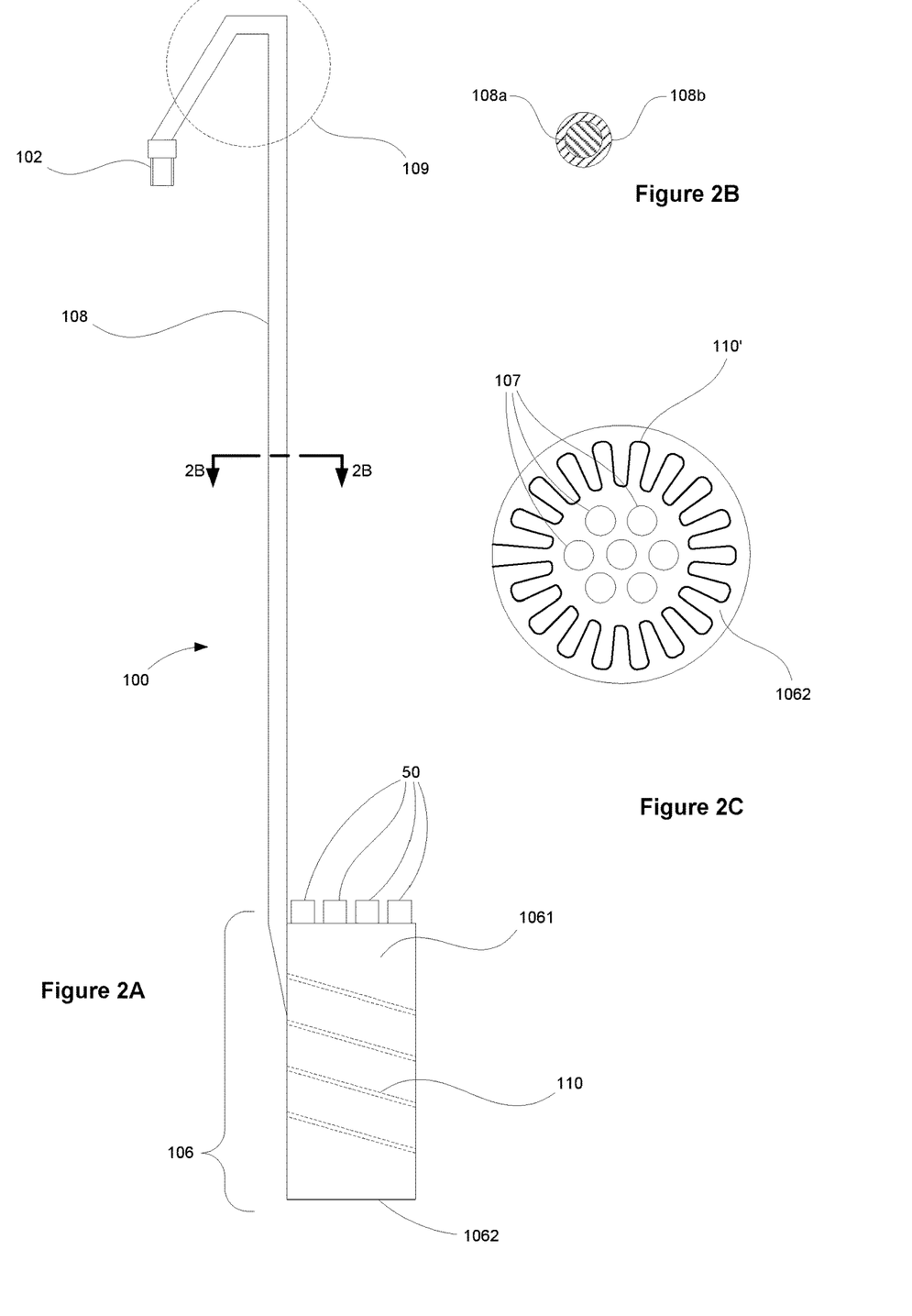
FIG. 2A is a side view of a canister suitable for use in the system illustrated in FIG. 1.
FIG. 2B is a view of a cross-section taken through an elongate member of the canister of FIG. 2A.
FIG. 2C is a view from below of a canister similar to that shown in FIG. 2A, but with an alternative antenna construction.

Attention is now directed to FIGS. 2A-2C, which illustrate example embodiments of canisters 100 that are suitable for use in the system illustrated in FIG. 1.

FIG. 2A, which is a side view of an example embodiment of a canister 100, shows clearly that the canister 100 includes a receptacle portion, within which a number of containers 50 are held. As may also be seen from FIG. 2A, the receptacle portion includes an antenna 110. The antenna 110 is configured to receive identifying information from the RFID tags of the containers 50 held within the receptacle portion that is sent in the form of electromagnetic radiation.

In the particular example of FIG. 2A, the canister 100 further includes an elongate member 108 that is attached at one longitudinal end to the receptacle portion 106 and at the other longitudinal end to the connector 102.

As may be seen from FIG. 2A, the canister may include a handle 109, which is provided adjacent the connector 102. In the particular example shown in FIG. 2A the handle 109 is provided as a bend in the elongate member 108. Hence, or otherwise, the elongate member 108 may be sufficiently rigid to enable the canister 100 to be handled by the elongate member 108, for instance enabling a user to remove the canister 100 from the vessel 10 by grasping the elongate member 108.

In the particular example shown in FIG. 2A and FIG. 2B, an electrical connection between the antenna 106 and the connector 102 is provided by an elongate conductor 180a that is arranged internally and along the length of this elongate member 108. This is illustrated more clearly in FIG. 2B, which is a cross-section taken through the elongate member 108 of the canister 100 of FIG. 2A. As may be seen from the drawing, the elongate conductor 108a is encased within a layer of insulating material 108b that is electrically and/or thermally insulating. For instance, the insulating material may have a thermal conductivity of less than 1 W/mK and preferably less than 0.1 W/mK. Where such material is electrically insulating, the transfer of electrical signals from one canister to another via the wall 11 of the vessel 10 (which is often metallic) may be reduced; thus interference between different canisters 100 may be reduced. As may also be seen from FIG. 2B, the insulating material 108b provides the exterior surface of the elongate member 108.

Suitable insulating materials may include fiberglass (e.g. epoxy or polyester resin bonded fibre glass) and polymers (e.g. polyimide, polyamide, polyethylene terephthalate glycol-modified, ultra-high molecular weight polyethylene etc).

The elongate conductor 108a may be formed of electrically conductive material that may be selected so as to have a relatively low thermal conductivity. This may reduce the transfer of heat by the elongate member 108 to the coolant fluid and, moreover, to the biological samples from exterior the vessel. The thermal conductivity of the electrically conductive material 108a may, for instance, be less than 100 W/mK and preferably less than 20 W/mK.

In a particular example, the electrically conductive material of the elongate conductor 108a may be stainless steel, which has a thermal conductivity of 16 W/mK. Hence (or otherwise), the elongate conductor within the elongate member 108 may be provided by stainless steel cable, for example coaxial stainless steel cable.

Returning now to FIG. 2A, in the particular example shown, the receptacle portion 106 includes a wall 1061 that defines the sides of the receptacle portion 106 and a base 1062 that defines the bottom of the receptacle portion 106. As shown in FIG. 2A, the wall may extend about a perimeter so as to surround the containers 50 when they are held within the receptacle portion 106, with the base 1062 supporting the containers 50. In some embodiments, such as that shown in FIGS. 2A-2C, the base 1062 may be joined to the edges of the wall. As is also shown in FIGS. 2A-2C, the base 1062 will typically be configured so as to allow coolant fluid to drain from the receptacle portion 106 when the canister is removed from the vessel and may therefore include a number of apertures 107 through which coolant fluid may drain.

In the example shown in FIG. 2A, the wall of the receptacle portion 106 includes the antenna 110. The antenna 110 may, for example, be provided as one layer within the wall and/or be encapsulated within the wall.

In the particular example shown in FIG. 2A, the antenna includes an elongate conductive element that is arranged as a helical coil; however, the antenna 110 may have any suitable shape that enables it to communicate wirelessly with the RFID tags of the containers 50. The antenna may conveniently be provided by a flexible PCB sheet.

In some examples, the wall may include an electromagnetic shielding layer, which is configured to substantially inhibit the escape of electromagnetic radiation emitted by the RFID tags from the receptacle portion 106. Such a shielding layer may reduce interference between different canisters 100 when reading. The antenna 110 may suitably be provided internally of the electromagnetic shielding layer.

In more detail, the electromagnetic shielding layer may, for example, be configured as a faraday shield. Thus, the shielding layer might include a layer of conductive material, shaped as a mesh or as a contiguous layer. The conductive material may be formed of a metal, such as stainless steel.

The wall may additionally, or instead, include one or more magnetic amplification layers. Such magnetic amplification layers may have high magnetic permeability, for example the relative magnetic permeability of the magnetic amplification layer may be greater than 50, more preferably greater than 75, still more preferably greater than 100. Further, the magnetic amplification layers may have a low magnetic loss tangent, for example less than 0.1, more preferably less than 0.05. High magnetic loss tangent values typically imply greater heat production, which is generally undesirable since it may affect the temperature of the coolant fluid and, moreover, the biological samples.

Magnetic amplification layers may, for example, comprise materials that are magnetic, but electrically non-conductive. For instance, ferrite materials, in particular soft ferrite materials, such as Nickel-Zinc ferrite, may be employed. Magnetic amplification layers comprising ferrite materials may conveniently be provided by polymer-backed ferrite sheet. Spinel materials may also be utilised in the magnetic amplification layers; indeed, many ferrites are also spinels. The inventors have experimented with nickel spinel magnesium aluminium materials, in particular TT2-111 from Trans-Tech.

In other examples, magnetic amplification layers may, for example, comprise materials that are magnetic, and electrically conductive. For instance, soft magnetic alloys may be utilised; for example, nickel-iron alloys, such as MuMetal® might be employed.

Account may have to be taken of the temperature of the coolant fluid 20 when selecting appropriate materials for the magnetic amplification layers, as magnetic permeability generally varies (in some cases strongly) with temperature.

The wall may be of laminate construction. For instance, the antenna 110 may be provided between two magnetic amplification layers with, optionally, an electromagnetic shielding layer that is provided externally to all of these layers.

Alternatively, components such as the antenna and the various layers may be encapsulated within material so as to form the receptacle portion 106. The encapsulating material may be an electrically and/or thermally insulating material, such as the fiberglass and polymer materials discussed above.

More generally, electrically and/or thermally insulating material may provide the exterior surface of the wall of the receptacle portion 106. As discussed above, where such material is electrically insulating, the transfer of electrical signals from one canister to another via the wall 11 of the vessel 10 (which is often metallic)—or indeed by direct contact between the receptacle portions of different canisters 100—may be reduced; thus interference between different canisters 100 may be reduced.

In still further examples, the canister 100 may be formed substantially of metallic material, such as, for example, stainless steel (whose low thermal conductivity has been remarked on above), or one of the soft magnetic alloys discussed above. In certain such cases, different metallic material may be used for the receptacle portion 106 than for the elongate member 108; in other such cases, the same metallic material may be used for both. In either case, the components of the canister 100 that carry electrical signals, such as the antenna 100 and the elongate conductor 108a may be encased within electrically insulating material (for example as a thin, electrically insulating layer) so as to prevent such electrical signals being carried on the exterior surfaces of the canister 100. This may reduce the risk of interference between canisters 100.

While in the example shown in FIG. 2A the wall of the receptacle portion 106 includes the antenna 110, this is by no means essential. This is demonstrated by the example embodiment of a canister shown in FIG. 2C, which is a view from beneath the canister 100. As is apparent from FIG. 2C, in the example of a canister shown therein, the antenna 110' is provided in the base of the receptacle portion 106. As may also be seen from the drawing, the antenna 110' includes an elongate conductive member that generally follows a looped path around the base of the receptacle portion 106. As is also apparent, the looped path is generally circular in shape.

In the particular example shown in FIG. 2C, the elongate conductive member is folded back on itself multiple times as it extends around the looped path. As is apparent from the drawing, substantially more of the length of the elongate conductive member is directed perpendicular to the looped path than is directed parallel to the looped path. Such measures may increase the cross-sectional area of the antenna available for transmission and reception of signals.

FIG. 2C also shows clearly the apertures 107 in the base through which coolant fluid may drain.

Figure 2D:
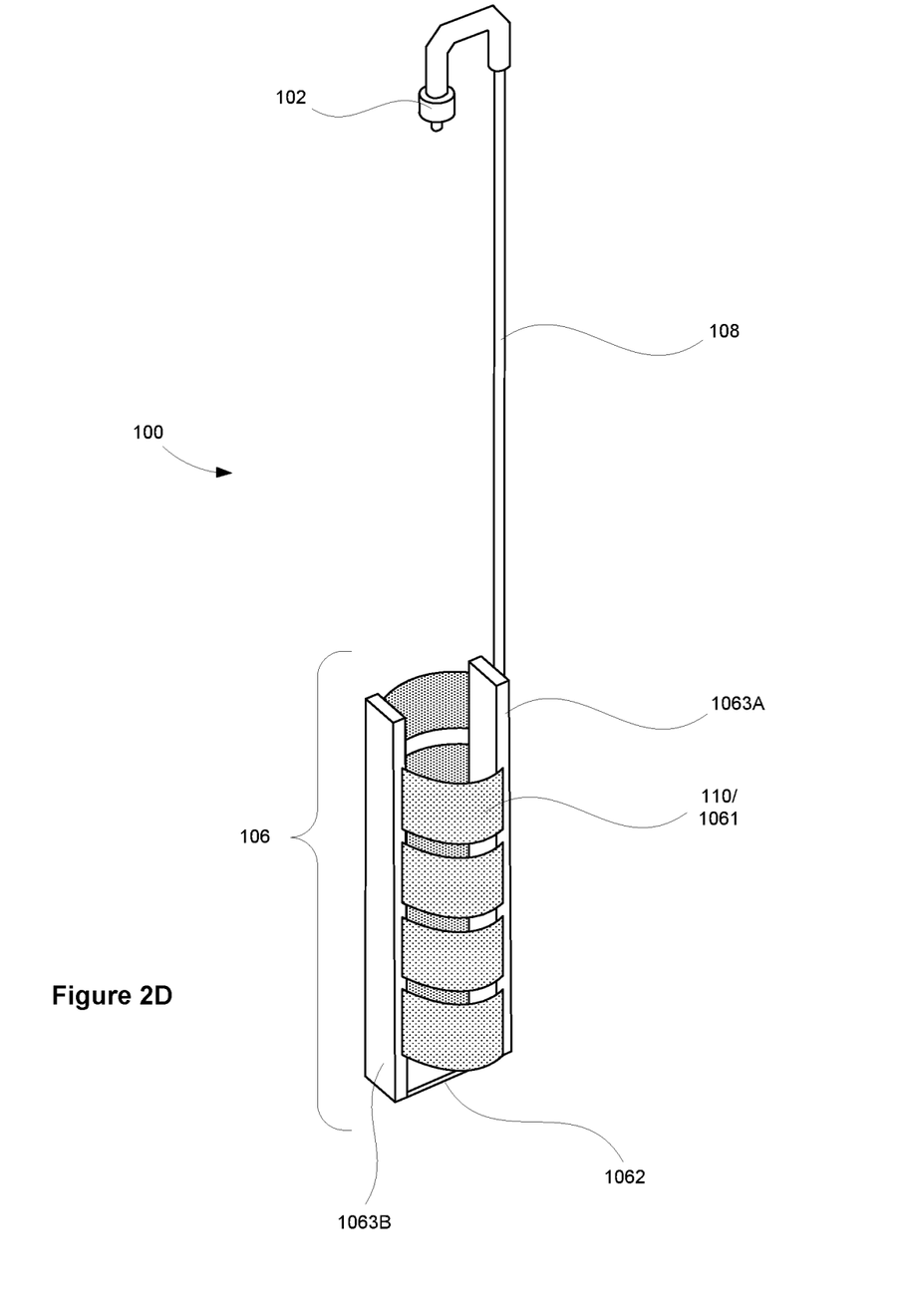
FIG. 2D is a perspective view of another canister suitable for use in the system illustrated in FIG. 1.

FIG. 2D is a perspective view of a further example embodiment of a canister 100, where, in contrast to the canister 100 shown in FIG. 2A, the antenna 110 provides the majority of the wall 1061 of the receptacle portion 106. As a result, the antenna 110, in addition to providing a communication function, provides a mechanical function in that it retains the containers 50 within the receptacle portion 106. Such an arrangement may be straightforward to manufacture.

In the particular example embodiment shown in FIG. 2D, the antenna 110 includes an elongate conductive element that is arranged as a helical coil. As is apparent from the drawing, this helical coil is formed of sheet metallic material. Such an arrangement may improve the effectiveness of the antenna 110 (in terms of transmission and reception of signals), while also being physically robust and effectively retaining the containers 50 within the receptacle portion 60.

As an alternative to (or in addition to) the antenna 110 including a helical coil, the antenna might include a plurality of conductive rings, disposed in a linear array. These rings may be arranged such that they share a common central axis (about which each ring is rotationally symmetric). As with the helical coil shown in FIG. 2D, such rings may be formed of sheet metallic material.

In the particular example shown in FIG. 2D, the helical coil is fixed to two support portions 1063A, 1063B, which each provide a portion of the wall 1061 of the receptacle portion 106. These support portions may improve the physical robustness of the component. Further, they may ensure that the turns of the coil do not contact each other and, for this reason (or otherwise) may be formed from a non-conductive material.

It may be noted that the spacing between consecutive turns of the helical coil shown in FIG. 2D is significantly less than the extent of each turn along the coil axis. This may improve the effectiveness of the antenna 110 (in terms of transmission and reception of signals), while also allowing the antenna 110 to effectively retain the containers 50 within the receptacle portion 60. A similar approach may be taken where conductive rings are used, with the spacing between consecutive rings being significantly less than the extent of each ring along the common central axis.

When manufacturing the canisters 100 described above with reference to FIGS. 1 and 2A-2D, it may be appropriate, depending on the temperature of the coolant fluid 20, to use specialist materials that are characterized for low temperatures. For instance, special epoxies (e.g. stycast 2850) and varnishes (e.g. GE 7031) may be utilised for bonding (e.g. of the elongate member 108 to the receptacle portion 106. Solder with lower amounts of tin (e.g. 60/40 tin lead solder) may be utilised for connecting electrical components, as low temperature environments may degrade tin, in a process commonly referred to as "tin pest". Specialist sealant tape (e.g. polyimide silicon adhesive tape) may be utilised for sealing gaps between components.

Figure 3:
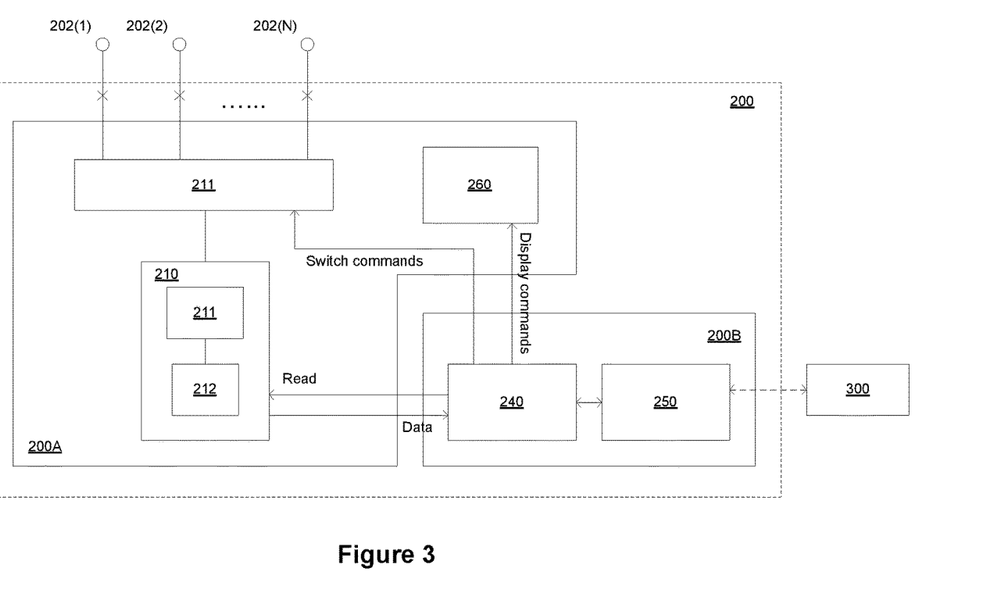
FIG. 3 is a schematic diagram of an example of a docking assembly suitable for use in the system illustrated in FIG. 1.

Attention is now directed to FIG. 3, which is a block diagram that illustrates schematically an example embodiment of a docking assembly suitable for use in the system illustrated in FIG. 1. As may be seen from the drawing, the docking assembly includes two modules: a neck module 200A and an additional module 200B. To ensure that the additional module 200B remains physically associated with the correct vessel 10, the additional module 200B may be configured so as to be strapped around the body of the vessel.

As discussed briefly above with reference to FIG. 1, and as is shown in FIG. 3, the additional module 200B is electrically connected to the neck module 200A. As is illustrated in FIG. 3 this connection enables the additional module 200B to receive data from the neck module 200A and enables the additional module 200B to send commands, such as "read" commands", to the neck module 200A. In the particular example shown in FIG. 3, the additional module 200B provides the wireless transceiver 250, which enables wireless communication with server 300, and includes a micro controller 240, which may for example be arranged as one or more processors.

As also shown in FIG. 3, the neck module 200A includes a single RFID interrogator or reader 210. This RFID interrogator includes an RFID chip 212 and a tuning circuit 211. The RFID interrogator 210 is configured to generate electrical interrogation signals, which are sent to the canisters 100 via the electrical connections between the docking assembly 200 and the canisters 100. When an electrical interrogation signal is applied to the antenna 110 of a canister it causes the transmission, by that antenna, of a wireless interrogation signal to the RFID tags of the containers 50 held in the canister 100 in question.

Conversely, the RFID interrogator is operable to analyse electrical response signals, which are generated in the antennas 110 of the canisters 100 in response to reception of a wireless response signal emitted by the RFID tag of a container 50, and communicated to the RFID interrogator 210 via the electrical connections between the canisters 100 and the neck module 200A. More particularly, the RFID interrogator 210 sends data to the micro controller 240 that is based on the analysis of the electrical response signal. This may be viewed as the RFID interrogator 210 converting data encoded in the electrical response signal into a format that is readable by the micro controller 240.

As is also illustrated in FIG. 3, the single RFID interrogator 210 is electrically connected to the plurality of connectors 202(1)-202(N) (and thereby the plurality of electrical connections between the canisters 100 and the docking assembly 200) via a multiplexer 211. This multiplexer 211 is configured so as to connect the RFID interrogator 210 with each canister 100 in turn for the sending and receiving of signals.

As FIG. 3 illustrates, the multiplexer 211 is under the control of micro controller 240. Thus, the particular canister 100 to which the RFID interrogator 210 is connected at any time may, for example, vary depending on switching commands sent by the micro controller 240 to the multiplexer 211.

As is also shown in FIG. 3, the neck module further includes a collection of status indicators and/or a display screen (shown generally as 260), which are also under the control of micro controller 240. The status information shown to the user using the display screen and/or indicators may therefore vary depending on display commands sent by the micro controller 240.

In a particular example, indicators on the neck module 200A, such as LEDs, are configured to indicate to the user that an error has occurred, for instance that a container 50 has been placed in the wrong canister 100. It should be noted that determining that a container 50 is in the wrong canister 100 may require that the micro controller 240 communicates with the server 300 using the wireless transceiver 250.

In addition, or instead, indicators on the neck module 200A may be configured to indicate the identity of a canister that contains a container that is to be removed. This may, for example, occur in response to an information message being sent from the server 300 to the micro controller 240 via the wireless transceiver. The information message specifies which canister the container to be removed is located in. This may be based on an audit of the containers 50 within each canister 100 that was carried out at previous point in time (e.g. the most recent of a series of regular audits carried out by the system), or the server 300 may have specifically instructed the micro controller 240 to carry out an audit of the containers 50 immediately prior to indicating which canister 100 contains the container 50 in question.

Of course, it should be appreciated that such indicators and display screens need not be provided on the neck module 200A and could instead be provided on the additional module 200B or could be provided on a dedicated module. However, it may be convenient to provide such features on that module of the docking assembly 200 which provides the connections to the canisters 100, so that these status information providing features may be seen by the user while he or she is interacting with the canisters. In a particular example, a respective indicator may be provided adjacent the connection to each canister 100.

Figure 4:
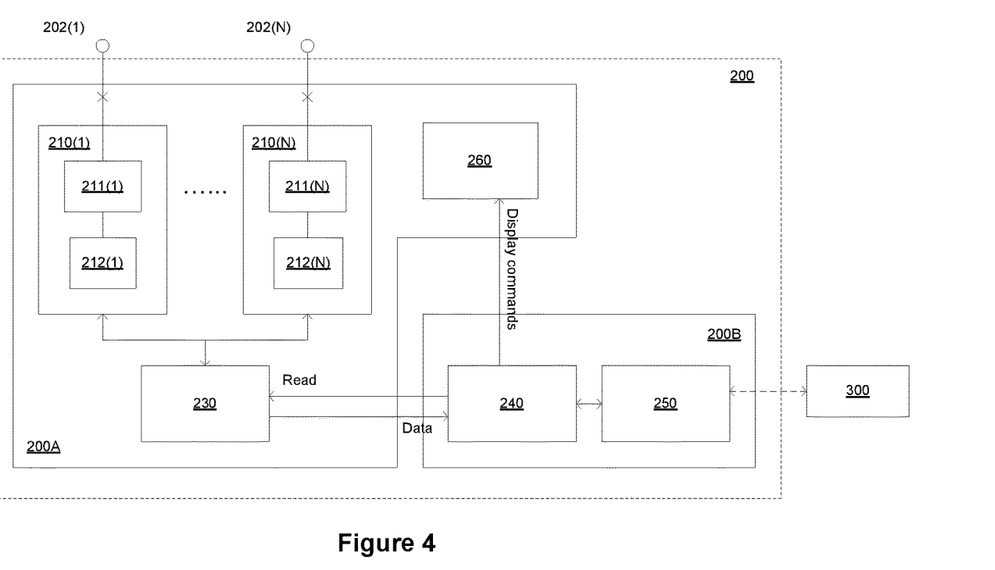
FIG. 4 is a schematic diagram of a further example of a docking assembly suitable for use in the system illustrated in FIG. 1.

FIG. 4 shows a block diagram of a further example embodiment of a docking assembly that is suitable for use in the system of FIG. 1. In contrast to the docking assembly of FIG. 3, the docking assembly 200 of FIG. 4 includes a number of RFID interrogators 210(1)-210(N). More particularly, a respective RFID interrogator 210 210(1)-210(N) is provided for each of the docking assembly connectors 202(1)-202(N). Thus, a dedicated RFID interrogator 210(1)-210(N) is provided for every canister 100 that is connected to the docking assembly 200.

As may also be seen from FIG. 4, the RFID interrogators 210(1)-210(N) are connected to the micro controller 240 via a data bus 230. Therefore, in response to receiving a read message from the micro controller 240, the data bus 230 may cause a specific one of the RFID interrogators 210(1)-210(N) to read its corresponding canister 100.

While in the example embodiments of docking assemblies described with reference to FIGS. 3 and 4 the docking assembly includes a neck module 200A and an additional module 200B it should be understood that in other embodiments the same functionality might reside in different modules and, moreover, in only a single module (which might be neither a neck module 200A nor an additional module 200B; for example, the single module could be a lid module).

While the examples present above have referred to only a single vessel 10, it should be understood that the system is scalable so as to be employed with multiple vessels 10. In such a case, the system may include multiple, like docking assemblies 200, with each docking assembly being mounted on a respective vessel 10. A single server 300 may control a group of, or all of the docking assemblies 200. For example, the server may be operable to send read messages to each of the docking assemblies 200, with the docking assemblies in response sending data to the server 300 identifying the containers 50 held in each of their canisters 100. Such read messages may be sent periodically and/or in response to a specific command by a user.

More generally, it should be appreciated that other examples and variations are contemplated within the scope of the appended claims.

Furthermore, it should be noted that the foregoing description is intended to provide a number of non-limiting examples that assist the skilled reader's understanding of the present invention and that demonstrate how the present invention may be implemented.

The invention claimed is:

1. A system for remote live auditing of biological samples contained in a vessel filled with coolant fluid, the system comprising:
   one or more canisters, each of which comprises a connector and is configured to hold at least one container, each of which contains one or more biological samples and has associated therewith an RFID tag identifying the container in question; and
   a docking assembly mountable on said vessel and comprising a plurality of connectors, each of which is configured to engage with the connector of one of said one or more canisters, thereby providing an electrical connection between the docking assembly and the canister in question, wherein the docking assembly comprises a neck module configured to be mounted around a neck of the vessel and wherein the plurality of connectors for the docking assembly are provided on said neck module;
   wherein each canister is operable to wirelessly interrogate the RFID tags of the one or more containers held therein, to receive information identifying the containers as a result of said interrogation, and to communicate this identifying information to the docking assembly via said electrical connection between the canister in question and the docking assembly.

2. The system of claim 1, wherein the docking assembly is configured to communicate, via said electrical connections, with the canisters and to thereby cause the canisters to wirelessly interrogate the RFID tags of the containers held therein.

3. The system of claim 1, wherein the docking assembly further comprises a wireless transceiver, wherein the docking assembly is configured to send said identifying information wirelessly to a server using said wireless transceiver, upon reception by the docking assembly, using the wireless transceiver, of a read message sent by said server; and wherein the docking assembly is configured to cause each canister in turn to interrogate the RFID tags of the containers therein.

4. The system of claim 1, wherein the docking assembly comprises:
   a lid arranged to engage the top of the vessel;
   wherein the neck module and the lid are configured to engage with one another and have an electrical connection therebetween; and
   wherein the connectors are located on the neck module such that they are circumferentially arranged around the neck of the vessel.

5. The system of claim 1, wherein each canister comprises:
   a receptacle portion, within which said containers are held, the receptacle portion including an antenna configured to receive identifying information from the RFID tags of the containers held within the receptacle portion sent in the form of electromagnetic radiation;
   wherein the receptacle portion comprises a wall that defines sides of the receptacle portion and a base that defines a bottom of the receptacle portion, optionally wherein the wall extends about a perimeter so as to surround the containers when they are held within the receptacle portion; and
   wherein the wall comprises an electromagnetic shielding layer, which is configured to substantially inhibit escape of electromagnetic radiation emitted by the RFID tags from the receptacle portion, wherein said layer is configured as a faraday shield.

6. The system of claim 5, wherein the wall of each of the one or more canisters comprises at least one magnetic amplification layer, having high magnetic permeability; and
wherein said at least one magnetic amplification layer is provided internally of said electromagnetic shielding layer.

7. The system of claim 6, wherein the antenna of the one or more canisters is provided either:
internally of said electromagnetic shielding layer and/or between two of said magnetic amplification layers, and wherein the wall comprises said antenna; or
in the base of the receptacle portion, and
wherein the antenna comprises an elongate conductive member that generally follows a looped path around the base of the receptacle portion, and wherein the elongate conductive member is folded back on itself multiple times as it extends around the looped path, wherein substantially more of a length of the elongate conductive member is directed perpendicular to the looped path than is directed parallel to the looped path.

8. The system of claim 5, wherein the docking assembly is operable to send an electrical interrogation signal to the antenna of each canister via the respective one of said electrical connections, said electrical interrogation signal causing transmission, by the antenna of the canister in question, of a wireless interrogation signal to the RFID tags of the containers held in the canister in question;
wherein the docking assembly comprises at least one RFID interrogator, each of which is operable to generate said electrical interrogation signal and operable to analyze electrical response signals, which are generated in the antennas of the canisters in response to reception of a wireless response signal emitted by the RFID tag of a container, and communicated to the RFID interrogator(s) via said electrical connections between the canisters and the docking assembly; and wherein
the docking assembly comprises a single RFID interrogator, which is electrically connected to said plurality of electrical connections between the canisters and the docking assembly via a multiplexer, the multiplexer being configured so as to connect the RFID interrogator with each canister in turn, or
the docking assembly comprises a respective RFID interrogator for each of the docking assembly connectors.

9. The system of claim 5, wherein each canister of the one or more canisters further comprises an elongate member attached at one longitudinal end to said receptacle portion and attached at the other longitudinal end to the corresponding connector of said canister;
wherein an electrical connection between the antenna of the receptacle portion and the connector of each canister is provided by an elongate conductor arranged internally and along a length of the elongate member; and
wherein said elongate conductor is provided internally of a layer of electrically and/or thermally insulating material.

10. The system of claim 1, wherein the docking assembly comprises micro-switches that are configured to detect at least one of:
that a canister has been removed; and
that a lid for the vessel has been removed.

* * * * *

UNITED STATES PATENT AND TRADEMARK OFFICE
CERTIFICATE OF CORRECTION

| | |
|---|---|
| PATENT NO. | : 11,446,669 B2 |
| APPLICATION NO. | : 16/322342 |
| DATED | : September 20, 2022 |
| INVENTOR(S) | : Enzo Fiondella et al. |

It is certified that error appears in the above-identified patent and that said Letters Patent is hereby corrected as shown below:

On the Title Page

Insert Item (73):
--KUSTODIAN LTD., Pinner, Middlesex (GB); Enzo FIONDELLA, Pinner, Middlesex (GB)--

Signed and Sealed this
Twenty-fifth Day of April, 2023

Katherine Kelly Vidal
*Director of the United States Patent and Trademark Office*